United States Patent
Kozasa et al.

(10) Patent No.: US 7,553,481 B2
(45) Date of Patent: Jun. 30, 2009

(54) UNDERWATER ANTIFOULING COATING COMPOSITION WITH EXCELLENT STORAGE STABILITY

(75) Inventors: Yasuhiro Kozasa, Chikujo-gun (JP); Yuji Koga, Chikujo-gun (JP)

(73) Assignee: API Corporation, Osaka (JP)

( * ) Notice: Subject to any disclaimer, the term of this patent is extended or adjusted under 35 U.S.C. 154(b) by 857 days.

(21) Appl. No.: 10/507,636

(22) PCT Filed: Mar. 14, 2003

(86) PCT No.: PCT/JP03/03143

§ 371 (c)(1), (2), (4) Date: Sep. 14, 2004

(87) PCT Pub. No.: WO03/078530

PCT Pub. Date: Sep. 25, 2003

(65) Prior Publication Data
US 2005/0123503 A1    Jun. 9, 2005

(30) Foreign Application Priority Data
Mar. 15, 2002 (JP) ............................ 2002-118579
Apr. 2, 2002 (JP) ............................ 2002-134713

(51) Int. Cl.
| | |
|---|---|
| A01N 55/02 | (2006.01) |
| C09D 5/16 | (2006.01) |
| C09J 101/00 | (2006.01) |
| C08K 5/37 | (2006.01) |
| C08K 5/3435 | (2006.01) |

(52) U.S. Cl. ................ 424/78.09; 523/122; 523/177; 524/86; 524/87; 524/96; 524/99; 524/174; 525/330.1; 525/386; 525/408

(58) Field of Classification Search ............... 524/86, 524/87, 96, 99, 174, 439, 555, 560; 523/122, 523/177; 525/330.1, 386, 408; 424/78.09
See application file for complete search history.

(56) References Cited

U.S. PATENT DOCUMENTS

| | | | | |
|---|---|---|---|---|
| 3,269,904 A | * | 8/1966 | Bernstein et al. | 514/345 |
| 4,039,312 A | * | 8/1977 | Patru | 504/122 |
| 4,454,137 A |   | 6/1984 | Menon et al. | |
| 5,703,323 A | * | 12/1997 | Rothgery et al. | 149/88 |
| 6,231,701 B1 | * | 5/2001 | Blomquist | 149/18 |

FOREIGN PATENT DOCUMENTS

| | | | |
|---|---|---|---|
| JP | 08269388 A | * | 10/1996 |
| JP | 2001288398 A | * | 10/2001 |
| JP | 2001-323208 | | 11/2001 |
| JP | 2001323208 A | * | 11/2001 |
| WO | 98/12141 | | 3/1998 |

* cited by examiner

Primary Examiner—David Wu
Assistant Examiner—Michael M Bernshteyn
(74) Attorney, Agent, or Firm—Wenderoth, Lind & Ponack, L.L.P.

(57) ABSTRACT

An underwater antifouling coating composition which contains a metal pyrithione compound and cuprous oxide as an active ingredient, and a compound represented by the general formula (II):

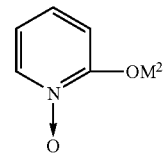

(II)

(wherein $M^2$ is H, Na, ½Zn or ½Cu) as a stabilizer has high storage stability over long.

14 Claims, No Drawings

UNDERWATER ANTIFOULING COATING COMPOSITION WITH EXCELLENT STORAGE STABILITY

This application is a U.S. national stage of International Application No. PCT/JP03/03143 filed Mar. 14, 2003.

TECHNICAL FIELD

The present invention relates to an underwater antifouling coating composition with excellent storage stability. More particularly, the present invention relates to an underwater antifouling coating composition containing a metal pyrithione compound, cuprous oxide and a stabilizer in which aggregation, thickening and gelation during storage are prevented.

BACKGROUND TECHNIQUE

Previously, in order to prevent adhesion of barnacle, sea lettuce and other marine organism to ships and various submarine structures, triorganotin polymer compounds have been generally used, but use thereof has been considerably limited due to marine pollution in recent years. In order to solve this problem, various underwater antifouling coating compositions using a metal pyrithione compound and cuprous oxide as an active ingredient have been proposed (U.S. Pat. No. 5,057,153 and JP-A No. 53-27630).

In addition, as a vehicle for an underwater antifouling painting agent, there is known a hydrolyzable resin composition containing at least one kind of a group, for example, represented by the following formula (III):

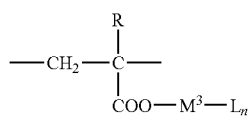

(III)

(wherein R represents hydrogen or an alkyl group of a carbon number of 1 to 4, $M^3$ represents Si, Cu or Zn, and L represents an alkyl group when $M^3$ is Si, or an organic acid residue when $M^3$ is Cu or Zn, and n is the number obtained by subtracting 1 from a valence of $M^3$)

in a molecule constituting a resin such as an acryl resin, as a so-called hydrolyzable resin which is gradually hydrolyzed in water and renews a surface of the coating film thereof is (JP-A No. 10-101969, JP-A No. 10-158547, JP-A No. 10-168350, JP-A No. 2000-265107, JP-A No. 2000-273365, JP-A No. 2000-273366, JP-A No. 2000-273384, JP-A No. 2000-273385, JP-A No. 63-128008, JP-A No. 11-302572 etc.).

However, it is know that, when an antifouling painting agent is prepared using a metal pyrithione compound and cuprous oxide as an active ingredient, aggregation or thickening is frequently caused during storage and, in the remarkable case, gelation is caused.

For example, in the case of a coating composition containing zinc pyrithione (ZPT) and cuprous oxide as an active ingredient, and a copper acryl resin as a vehicle, a denatured substance is produced as a byproduct in a composition by a metal exchange reaction from ZPT to copper pyrithione CPT, and causes aggregation or thickening, consequently gelation.

In addition, in the case of a coating composition containing CPT and cuprous oxide, it is said that aggregation or thickening and, occasionally, gelation of the coating composition is caused depending upon the quality of cuprous oxide, particularly, an amount of a metal copper included in the composition.

An underwater antifouling painting agent having improved storage stability that contains metal pyrithione and cuprous oxide was studied, and several patents have been already proposed (U.S. Pat. Nos. 5,098,473, 5,112,397, 5,137,569). However, these painting agents also have insufficient storage stability and, moreover, cause for this storage instability has not been sufficiently clarified now yet. Therefore, a problem as to how a coating composition can be stabilized regardless of quality of metal pyrithione and cuprous oxide has not been solved.

DISCLOSURE OF THE INVENTION

The present inventors intensively studied a method of stably storing an antifouling coating composition containing, as an active ingredient, inexpensive and safe cuprous oxide and metal pyrithione which have previously been used for a long time and, as a result, found that, by inclusion of zinc bis(2-pyridyloxy)N,N'-dioxide (ZPO), copper bis(2-pyridyloxy)N, N'-dioxide (CPO), sodium-2-pyridyloxy-N-oxide (NaPO), or 2-hydroxypyridine-N-oxide (HPO) as a stabilizer in an antifouling coating composition, an underwater antifouling painting agent can be unexpectedly stabilized over a long term, which resulted in completion of the present invention.

That is, the present invention is:

1. An underwater antifouling coating composition with excellent storage stability, which contains a metal pyrithione compound represented by the general formula (I):

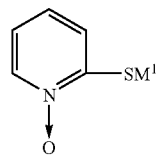

(I)

(wherein $M^1$ is ½Zn or ½Cu)

and cuprous copper as an active ingredient, a compound represented by general formula (II):

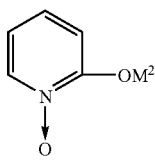

(II)

(wherein $M^2$ is H, Na, ½Zn or ½Cu)

as a stabilizer, and a resin as a coating vehicle,

2. The underwater antifouling coating composition according to 1., which contains the compound represented by the general formula (II) at 0.1 to 10 parts by weight relative to 100 parts by weight of the metal pyrithione compound represented by the general formula (I), 3. The underwater antifouling coating composition according to 1., which contains the compound of the general formula (I) at 1 to 10 parts by weight relative to 100 parts by weight of the coating composition, and 4. The underwater antifouling coating composition according to any one of 1. to 3., wherein the resin contains a hydrolyzable resin containing, as molecular constituent unit, at least one kind of a group represented by the general formula (III):

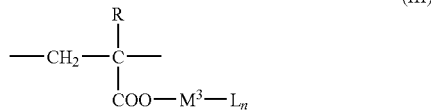

(wherein R represents hydrogen or an alkyl group of a carbon number of 1 to 4, $M^3$ represents Si, Cu or Zn, L represents an alkyl group when $M^3$ is Si, or an organic acid residue when $M^3$ is Cu or Zn, and n is the number obtained by subtracting 1 from a valency of $M^3$).

In the metal pyrithione compound of the general formula (I) used in the present invention, the compound in which $M^1$ is ½Zn is a compound called zinc pyrithione (ZPT), and the compound in which $M^1$ is ½Cu is a compound called copper pyrithione (CPT).

A ratio of the metal pyrithione compound (I) to be used relative to 100 parts by weight of the coating composition of the present invention is usually 1 to 10% by weight, preferably 2 to 7% by weight, and a ratio of cuprous oxide to be used is 1 to 50% by weight, preferably 20 to 50 by weight.

In the compound represented by the general formula (II), the compound in which $M^2$ is Na is abbreviated as NaPO, the compound in which $M^2$ is ½Zn is abbreviated as ZPO, the compound in which $M^2$ is ½Cu is abbreviated as CPO, and the compound in which $M^2$ is H is abbreviated as HPO in some cases.

In the coating composition of the present invention, coexistence of this compound (II) exerts effect of stabilizing storage of the underwater antifouling coating composition. The compound (II) is the known compound, and is described, for example, in U.S. Pat. No. 3,269,904, U.S. Pat. No. 4,454,137, and Inorganica Chimica Acta Vol. 51 109-115(1981).

An amount of the compound (II) to be added to the coating composition is not particularly limited, but is usually 0.1 to 10 parts by weight, preferably 0.2 to 7 parts by weight relative to 100 parts by weight of the compound (I) from a viewpoint of blending composition, antifouling performance and economy.

Examples of the alkyl group of a carbon number of 1 to 4 represented by R in the formula (III) include methyl, ethyl and propyl. $M^3$ represents Si, Cu or Zn, and L represents an alkyl group when $M^3$ is Si, or an organic acid residue when $M^3$ is Cu or Zn. And, n is the number obtained by subtracting 1 from a valency of $M^3$. Examples of the alkyl group represented by L include alkyl groups of a carbon number of 1 to 4 such as methyl, ethyl, propyl, isopropyl, butyl, isobutyl, hexyl, octyl, dodecyl, ethyldimethyl, butyldimethyl, and octyldimethyl, examples of the organic acid residue include a group represented by $R^1COO-$ ($R^1$ is hydrocarbon residue) and, in the case, examples of $R^1$ include saturated or unsaturated aliphatic groups of a carbon number of 1 to 20 such as methyl, ethyl, propyl, octyl, nonyl, nonenyl, decyl, and decenyl, and aromatic groups such as phenyl and naphthyl.

The hydrolyzable type resin containing at least one kind of a group represented by the general formula (III) as a constituent unit in a molecule is usually prepared by the following process.

That is, the process includes a process of preparing the hydrolyzable resin by polymerizing a polymerizable unsaturated monomer alone having a group represented by the general formula (III), or copolymerizing other copolymerizable monomer (hereinafter, referred to as monomer process), and a process of preparing a resin having a predetermined functional group by polymerization, and reacting the functional group in the prepared resin with other compound to prepare a hydrolyzable resin containing at least one kind of a group represented by the general formula (III) as a constituent unit in a molecule (hereinafter, referred to as polymer process).

Examples of the process of the monomer process are described in JP-A No. 10-101969, JP-A No. 10-158547, JP-A No. 10-168350, JP-A No. 2000-265107, JP-A No. 2000-273365, JP-A No. 2000-273366, JP-A No. 2000-273384, and JP-A No. 2000-273385. Examples of the process of the polymer process are described in JP-A No. 63-128008, and JP-A No. 11-302572.

The resin is prepared by the monomer process when $M^3$ is Si in the general formula (III), or by the monomer process and the polymer process when $M^3$ is Cu or Zn.

When $M^3$ is Si, the resin is prepared by the monomer process of copolymerizing a copolymerizable Si-containing monomer A and other copolymerizable monomer B. Examples of the Si-containing monomer A include trimethylsilyl(meth)acrylate ((meth)acrylate means acrylate or methacrylate, the same hereinafter), triethylsilyl(meth)acrylate, tripropylsilyl(meth)acrylate, triisopropylsilyl(meth)acrylate, tributylsilyl(meth)acrylate, triisobutylsilyl(meth)acrylate, trihexylsilyl(meth)acrylate, trioctylsilyl(meth)acrylate, tridodecylsilyl(meth)acrylate, ethyldiethylsilyl(meth)acrylate, butyldimethylsilyl(meth)acrylate, and octyldi-butylsilyl(meth)acrylate. Examples of other copolymerizable monomer B include methyl(meth)acrylate (methyl (meth)acrylate means methyl acrylate or methyl methacrylate, the same hereinafter), ethyl(meth)acrylate, isopropyl (meth)acrylate, butyl(meth)acrylate, isobutyl(meth)acrylate, and 2-ethylhexyl(meth)acrylate. When $M^3$ is Cu or Zn, the resin can be prepared by a monomer process of copolymerizing a copolymerizable acrylic acid compound monomer C which is represented by the general formula (III) and bound with Cu or Zn, and the aforementioned monomer B, or a polymer process of copolymerizing carboxylic acid having an unsaturated double bond such as acrylic acid and methacrylic acid, and the aforementioned other copolymerizable monomer B to prepare a polymer having a functional group, and reacting this polymer with a low boiling point organic acid, for example, a Cu salt or a Zn salt of acetic acid or propionic acid with an organic monobasic acid having a sufficiently higher boiling point than that of the aforementioned low boiling point organic acid to remove the low boiling point organic acid. Examples of the copolymerizable acrylic acid monomer C containing a group bound with Cu or Zn in a molecule represented by the general formula (III) include copper (zinc) acetate(meth)acrylate (copper (zinc) acetate means copper acetate or zinc acetate, the same hereinafter, (meth)acrylate is as defined above), copper (zinc) propionate (meth)acrylate, and copper (zinc) octoate(meth)acrylate. Examples of the organic monobasic acid having a sufficiently high boiling point used in the polymer process include benzoic acid, salicylic acid, lauric acid, stearic acid, linoleic acid, oleic acid, and naphthenic acid.

A content of a group represented by the general formula (III) in the hydrolyzable resin containing a group the represented by the general formula (III) as a constituent unit in a molecule obtained by the aforementioned process is usually 20 to 70% by weight, preferably 30 to 60% by weight. An amount of this resin to be blended relative to a total painting composition is 5 to 20 parts by weight, desirably 7 to 15 parts by weight as a resin solid matter in 100 parts of the coating composition.

Examples of other resin used in the present invention include rosin, acryl, polybutene, chlorinated rubber, vinyl chloride, alkyd, coumarone, and ethylene-vinyl acetate resins, and a hydrolyzable resin containing the group represented by the general formula (III) as a constituent unit in a molecule is preferable. These resins may be used alone or by mixing two or more. A total amount of resins to be formulated is usually 5 to 80% by weight, preferably 7 to 70% by weight relative to the coating composition.

The antifouling coating composition of the present invention may contain a plasticizer, an organic solvent, a pigment, and other various additives, for example, a thickener and a wetting agent in addition to the aforementioned components.

Further, the coating composition of the present invention may contain arbitrary additives which have favorable influence on viscosity, wettability, dispersibility, freezing prevention, stability of an electrolyte, and foamability. A total amount of arbitrary additives is preferably 20% by weight or smaller, more preferably about 1 to 5% by weight based on a total weight of the coating composition.

A representative thickener include cellulose derivative such as methylcellulose, hydroxyethylcellulose, hydroxypropylcellulose and carboxymethylcellulose, poly(vinyl alcohol), a salt of poly(acrylic acid) and a salt of acrylic acid/acrylamide copolymer.

A suitable wetting agent and dispersant include amide wax, sodium polyphosphate, aryl or alkyl phosphate, a salt of low-molecular poly(acrylic acid), a salt of poly(ethanesulfonic acid), a salt of poly(vinylphosphonic acid), a salt of poly(maleic acid), a salt of maleic acid and ethylene copolymer, and a salt of 1-olefin having 3 to 18 carbon atoms and/or styrene copolymer.

In order to enhance stability to freezing and electrolytes, various carrier amounts of a coating composition of 1,2-diol, for example, glycol, propylene-glycol-(1,2), and butylene-glycol(1,2) or a polymer thereof, or ethoxyl compound, for example, a reaction product of ethylene oxide and long chain alkanol, amine, carboxylic acid, carboxylic acid amide, alkydphenol, poly(propylene-glycol) or poly(butylene-glycol) can be added.

BEST MODE FOR CARRYING OUT THE INVENTION

The following resin Preparation Examples, Examples, and Experimental Examples illustrate the present invention specifically, but the present invention is not limited by them. Unless otherwise indicated, "part" and "%" are based on weight.

PREPARATION EXAMPLE 1

Preparation of Hydrolyzable Resin

100 Parts of xylene and 20 parts of butanol were added to a four-neck flask provided with a refluxing condenser, a stirrer, a nitrogen introducing tube and an addition funnel, followed by warming to 100 to 110° C. To this solution was added dropwise a mixed solution of 7.7 parts of methacrylic acid, 64.4 parts of methyl methacrylate, 28 parts of 2-ethylhexyl acrylate, and 3 parts of azobisisobutyronitrile over 4 hours. After completion of addition, the mixture was retained at 110° C. for 30 minutes, a mixed liquid of 20 parts of xylene, 10 parts of butanol and 0.5 part of azobisisobutyronitrile was added over 1 hour, and a temperature of the mixture was maintained for 2 hours after addition. Content of the solid matter of the resulting resin solution (varnish A) was 39.8% by weight, and a solid matter acid value was 50 mgKOH/g.

100 Parts of varnish A, 7.4 parts of copper propionate, 10 parts of naphthenic acid, and 20 parts of deionized water were added to a four-neck flask provided with a refluxing condenser, a stirrer, a nitrogen introducing tube and a decanter, the mixture was heated to 100° C., and water, and propynoic acid produced with progression of the reaction were removed. An end point of the reaction was determined by quantitating propionic acid in an overflowed solvent, water in the system was completely removed, the reaction was completed, and xylene was added. Like this, varnish 1 having a solid matter of 52.3% by weight and a viscosity P by a foam viscometer was obtained.

PREPARATION EXAMPLE 2

Preparation of Hydrolyzable Resin

30 Parts of propylene glycol methyl ether and 40 parts of xylene were charged into a four-neck flask provided with a condenser, a stirrer, a thermometer and an addition funnel, and a temperature was raised to 100° C. while stirring. Subsequently, a mixture of a monomer and a polymerization initiator shown below was added dropwise at an equal rate over 3 hours from an addition funnel.

| | |
|---|---|
| Triisopropylsilyl methacrylate | 30 parts |
| Zinc methacrylate | 30 parts |
| Methyl methacrylate | 30 parts |
| 2-Methoxyethyl acrylate | 10 parts |
| t-Butyl peroctoate | 3 parts |

After completion of addition, 1 part of t-butyl peroctoate and 10 parts of xylene were added dropwise over 2 hours, the mixture was stirred for 2 hours, the reaction was completed and 20 parts of xylene was added. Whereby, a varnish 2 having a solid matter of 50.2% by weight and a viscosity Y by a foam viscometer was obtained.

EXAMPLES AND COMPARATIVE EXAMPLES

Using varnishes 1 and 2 obtained in Preparation Examples 1 and 2, a coating composition was prepared so that the formation shown in Table 1 was obtained.

TABLE 1

| | | Example | | | | | | | | Comparative Example | |
|---|---|---|---|---|---|---|---|---|---|---|---|
| Component | | 1 | 2 | 3 | 4 | 5 | 6 | 7 | 8 | 1 | 2 |
| ZPT | | 3 | 3 | 3 | 3 | | | | | 3 | |
| CPT | | | | | | 3 | 3 | 3 | 3 | | 3 |

TABLE 1-continued

| | Example | | | | | | | | Comparative Example | |
|---|---|---|---|---|---|---|---|---|---|---|
| Component | 1 | 2 | 3 | 4 | 5 | 6 | 7 | 8 | 1 | 2 |
| ZPO | 0.15 | | | | 0.15 | | | | | |
| CPO | | 0.15 | | | | 0.15 | | | | |
| HPO | | | 0.15 | | | | 0.15 | | | |
| NaPO | | | | 0.15 | | | | 0.15 | | |
| Cuprous oxide | 35 | 35 | 35 | 35 | 35 | 35 | 35 | 35 | 35 | 35 |
| Red iron oxide | 8 | 8 | 8 | 8 | 8 | 8 | 8 | 8 | 8 | 8 |
| Talc | 5 | 5 | 5 | 5 | 5 | 5 | 5 | 5 | 5 | 5 |
| Varnish 1 | 10 | 10 | 10 | 10 | | | | | 10 | |
| Varnish 2 | | | | | 10 | 10 | 10 | 10 | | 10 |
| Amide wax 20% xylene solution | 2 | 2 | 2 | 2 | 2 | 2 | 2 | 2 | 2 | 2 |
| Xylene | 36.85 | 36.85 | 36.85 | 36.85 | 36.85 | 36.85 | 36.85 | 36.85 | 37 | 37 |
| Total | 100 | 100 | 100 | 100 | 100 | 100 | 100 | 100 | 100 | 100 |

Unit: part by weight

Coating compositions of Examples 1 to 8, and Comparative Examples 1 to 2 were placed into a respective coating can, and allowed to stand in a constant temperature container at 40° C. After prescribed days passed, the coating compositions were taken out, viscosities were measured at 25° C. with a Stormer viscometer, and the results are shown in Table 2.

TABLE 2

| | Example | | | | | | | | Comparative Example | |
|---|---|---|---|---|---|---|---|---|---|---|
| Time | 1 | 2 | 3 | 4 | 5 | 6 | 7 | 8 | 1 | 2 |
| Initial | 59 | 60 | 60 | 61 | 68 | 68 | 67 | 69 | 60 | 68 |
| One day after | 62 | 60 | 62 | 62 | 69 | 68 | 70 | 69 | 62 | 69 |
| One week after | 60 | 61 | 62 | 60 | 70 | 73 | 70 | 70 | Gelation | 98 |
| Two weeks after | 63 | 61 | 61 | 63 | 71 | 70 | 70 | 70 | Gelation | 108 |
| Four weeks after | 63 | 61 | 62 | 61 | 71 | 70 | 71 | 69 | Gelation | 120 |

Unit of viscosity: K.U.

In the coating composition containing ZPO, CPO, HPO or NaPO, thickening and gelation were not recognized even after 4 weeks at 40° C.

A particle size was measured with a fineness-of-grind gauge, and results are shown in Table 3.

TABLE 3

| | Example | | | | | | | | Comparative Example | |
|---|---|---|---|---|---|---|---|---|---|---|
| Time | 1 | 2 | 3 | 4 | 5 | 6 | 7 | 8 | 1 | 2 |
| Initial | 50 | 50 | 50 | 50 | 50 | 50 | 50 | 50 | 50 | 50 |
| One day after | 50 | 50 | 50 | 50 | 50 | 50 | 50 | 50 | 50 | 50 |
| One week after | 50 | 50 | 50 | 50 | 50 | 50 | 50 | 50 | 100 or larger | 100 or larger |
| Two weeks after | 50 | 50 | 50 | 50 | 50 | 50 | 50 | 50 | 100 or larger | 100 or larger |
| Four weeks after | 50 | 50 | 50 | 50 | 50 | 50 | 50 | 50 | 100 or larger | 100 or larger |

Unit of particle size: μm

In the coating composition containing ZPO, CPO, HPO or NaPO, increase in a diameter of a coating particle was not recognized even after 4 weeks at 40° C.

INDUSTRIAL APPLICABILITY

Since the coating composition of the present invention causes little marine pollution unlike a tin-containing underwater antifouling coating composition, well prevents adhesion of marine organisms such as barnacle and sea lettuce to ships and various underwater structures, and exhibits storage stability over a long term, it is extremely useful as an underwater antifouling coating composition.

The invention claimed is:

1. An underwater antifouling coating composition with excellent storage stability, which comprises a metal pyrithione compound represented by the general formula (I):

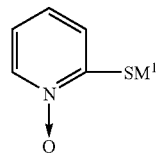

(I)

wherein $M^1$ is ½Zn or ½Cu,
and cuprous oxide as an active ingredient, a compound represented by the general formula (II):

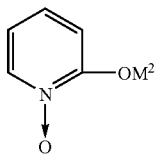

(II)

wherein $M^2$ is H, Na, ½Zn or ½Cu,
as a stabilizer, and a resin as a coating vehicle.

2. The underwater antifouling coating composition according to claim 1, wherein the compound represented by the general formula (II) is contained in an amount of 0.1 to 10 parts by weight relative to 100 parts by weight of the metal pyrithione compound represented by the general formula (I).

3. The underwater antifouling coating composition according to claim 1, wherein the compound of the general formula (I) is contained in an amount of 1 to 10 parts by weight relative to 100 parts by weight of the coating composition.

4. The underwater antifouling coating composition according to claim 1, wherein the resin comprises a hydrolyzable resin containing, as a molecular constituent unit, at least one group represented by the general formula (III):

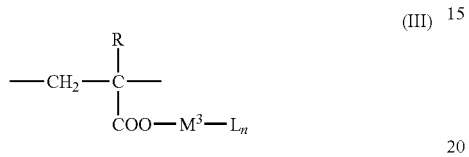
(III)

wherein R represents hydrogen or an alkyl group having a carbon number of 1 to 4, $M^3$ represents Si, Cu or Zn, L represents an alkyl group when $M^3$ is Si, or an organic acid residue when $M^3$ is Cu or Zn, and n is the number obtained by subtracting 1 from a valency of $M^3$.

5. The underwater antifouling coating composition according to claim 2, wherein the resin comprises a hydrolyzable resin containing, as a molecular constituent unit, at least one group represented by the general formula (III):

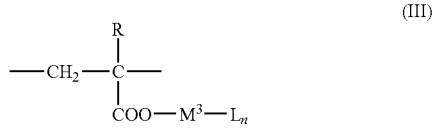
(III)

wherein R represents hydrogen or an alkyl group having a carbon number of 1to 4, $M^3$ represents Si, Cu or Zn, L represents an alkyl group when $M^3$ is Si, or an organic acid residue when $M^3$ is Cu or Zn, and n is the number obtained by subtracting 1 from a valency of $M^3$.

6. The underwater antifouling coating composition according to claim 3, wherein the resin comprises a hydrolyzable resin containing, as a molecular constituent unit, at least one group represented by the general formula (III):

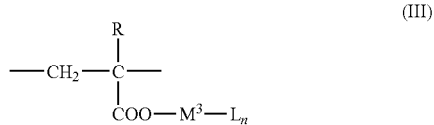
(III)

wherein R represents hydrogen or an alkyl group having a carbon number of 1 to 4, $M^3$ represents Si, Cu or Zn, L represents an alkyl group when $M^3$ is Si, or an organic acid residue when $M^3$ is Cu or Zn, and n is the number obtained by subtracting 1 from a valency of $M^3$.

7. A method for preventing aggregation, thickening or gelation of an underwater antifouling coating composition, which comprises combining a metal pyrithione compound represented by the general formula (I):

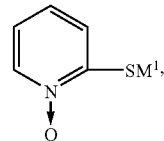
(I)

wherein $M^1$ is ½Zn or ½Cu, cuprous oxide as an active ingredient, a resin as a coating vehicle,
and a compound represented by the general formula (II):

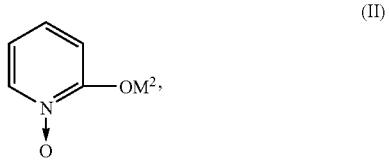
(II)

wherein $M^2$ is H, Na, ½Zn or ½Cu, as a stabilizer, to obtain the coating composition.

8. The method according to claim 7, wherein the compound represented by the general formula (II) is 0.1 to 10 parts by weight relative to 100 parts by weight of the metal pyrithione compound represented by the general formula (I).

9. The method according to claim 7, wherein the compound of the general formula (I) is 1 to 10 parts by weight relative to 100 parts by weight of the coating composition.

10. The method according to claim 7, wherein the resin comprises a hydrolyzable resin comprising, as a molecular constituent unit, at least one group represented by the general formula (III):

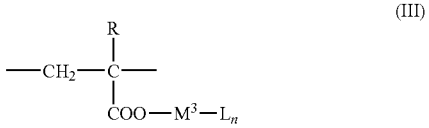
(III)

wherein R represents hydrogen or an alkyl group having a carbon number of 1 to 4, $M^3$ represents Si, Cu or Zn, L represents an alkyl group when $M^3$ is Si, or an organic acid residue when $M^3$ is Cu or Zn, and n is the number obtained by subtracting 1 from a valency of $M^3$.

11. A method for preventing adhesion of marine organisms to an underwater surface, which comprises applying an underwater antifouling coating composition to the underwater surface,
wherein the coating composition comprises a metal pyrithione compound represented by the general formula (I):

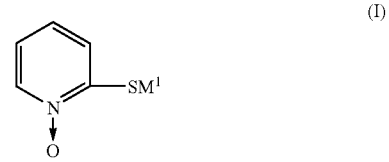
(I)

wherein $M^1$ is ½Zn or ½Cu, cuprous oxide as an active ingredient, a compound represented by the general formula (II):

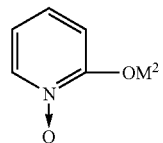
(II)

wherein $M^2$ is H, Na, ½Zn or ½Cu,
as a stabilizer and a resin as a coating vehicle.

12. The method according to claim 11, wherein the compound represented by the general formula (II) is 0.1 to 10 parts by weight relative to 100 parts by weight of the metal pyrithione compound represented by the general formula (I).

13. The method according to claim 11, wherein the compound of the general formula (I) is 1 to 10 parts by weight relative to 100 parts by weight of the coating composition.

14. The method according to claim 11, wherein the resin comprises a hydrolyzable resin comprising, as a molecular constituent unit, at least one group represented by the general formula (III):

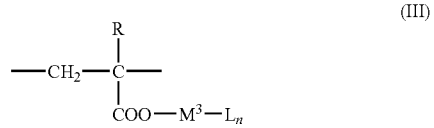
(III)

wherein R represents hydrogen or an alkyl group having a carbon number of 1 to 4, $M^3$ represents Si, Cu or Zn, L represents an alkyl group when $M^3$ is Si, or an organic acid residue when $M^3$ is Cu or Zn, and n is the number obtained by subtracting 1 from a valency of $M^3$.

\* \* \* \* \*